(12) United States Patent
Maddipati et al.

(10) Patent No.: US 8,296,225 B2
(45) Date of Patent: Oct. 23, 2012

(54) TIME-EFFICIENT AND DETERMINISTIC ADAPTIVE SCORE CALIBRATION TECHNIQUES FOR MAINTAINING A PREDEFINED SCORE DISTRIBUTION

(75) Inventors: Sridhar Maddipati, San Diego, CA (US); Scott M. Zoldi, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 338 days.

(21) Appl. No.: 12/784,399

(22) Filed: May 20, 2010

(65) Prior Publication Data

US 2011/0288989 A1 Nov. 24, 2011

(51) Int. Cl.
*G06Q 40/00* (2012.01)
(52) U.S. Cl. ............................................ 705/38; 705/35
(58) Field of Classification Search .................... 705/35, 705/38
See application file for complete search history.

(56) References Cited

U.S. PATENT DOCUMENTS 7,003,504 B1 * 2/2006 Angus et al. .......................... 1/1
2010/0257006 A1 * 10/2010 Quadracci et al. ................. 705/7

* cited by examiner

*Primary Examiner* — Jagdish Patel
*Assistant Examiner* — Kevin Poe
(74) *Attorney, Agent, or Firm* — Mintz Levin Cohn Ferris Glovsky and Popeo, P.C.

(57) ABSTRACT

A system and method for maintaining a pre-defined score distribution for financial transactions are disclosed. A number of memory spaces are defined for a memory structure. Transaction data for the financial transactions is received by the system. Each of the financial transactions is scored based on the transaction data to generate a batch of scores for the financial transactions. A score range is divided into k bins, where each of the k bins representing one memory space of the memory spaces of the memory structure. The batch of scores are aggregated by storing a count of each score of the batch of scores in an associated memory space of the plurality of memory spaces, and a percentile is computed for each score in the batch of scores based on a set of values associated with the count of each score. Each new financial transaction is scored to generate a new score, and a new percentile is assigned to the new score according to the set of values. The percentile of the new score is translated to a calibration score with fixed percentile characteristics according to a fixed reference curve.

10 Claims, 10 Drawing Sheets

$$\text{path}(s) = \text{base}_2(s-1)$$
$$\text{path}(5) = \text{base}_2(4) = 100$$

TIME-EFFICIENT AND DETERMINISTIC ADAPTIVE SCORE CALIBRATION TECHNIQUES FOR MAINTAINING A PREDEFINED SCORE DISTRIBUTION

BACKGROUND

This disclosure relates generally to fraud scoring models, and more particularly to systems and methods for maintaining a pre-defined fixed score distribution by using online calibration of the fraud scores in an adaptive manner.

The distribution of model scores produced by a payment card fraud detection solution such as the Falcon™ Fraud Manager deployed by Fair Isaac Corporation, or any other scoring model, can change with time and vary among different clients. However, some customers would prefer the score distribution to remain constant in production to meet operational constraints in view of fixed analyst resources to review the cases. If the case volume is changing, other customers would like to be alerted to this shift in order to respond with additional resources.

The raw score can be calibrated based on the percentile of the initial score distribution, thereby maintaining a fixed distribution of the final calibrated scores. The percentile is the common key between the production raw score distribution and the reference curve produced from the model building exercise, and is typically included in a customer's model report. However, generating the percentiles of raw scores in production can be impractical, particularly for transaction models given both the time efficiency and fixed memory requirement for transaction-based online scoring models.

Conventional score calibration approaches are flawed in several ways. First, the score distribution characteristics, and hence related staffing requirements, are usually averaged over the previous 12-24 months of data to develop the model, and do not reflect the variation from month to month in case generation, for example during holiday periods where case volume dramatically increases given the change in customer behavior associated with the holiday. Also, the models using conventional calibration techniques cannot anticipate changes in the score distribution characteristics of the model based on changes in fraud rate or natural economic trends in spending behavior that will happen over the life of the model. The change in the fraud rate or economic trending will cause the performance characteristics of the model to not oscillate around an average behavior, but rather to trend differently altogether. However, it is known to be very undesirable to change case generation rules constantly by choosing different score thresholds in response to changing score distributions.

SUMMARY

In general, this document discloses systems and methods for adaptively maintaining a pre-defined fixed score distribution of fraud scores, to allow a model to calibrate the case volume in production based on the variations in the raw score distribution. In particular, this document presents two deterministic techniques to allow maintenance of a pre-defined fixed score distribution by using online calibration of the scores in an adaptive manner. In other words, the present systems and methods are configured to re-calibrate the fraud score so that, if the score distribution of the model changes, the fraud scores work the same way and will yield the similar case volume characteristics.

In accordance with one aspect, a computer-implemented method for maintaining a pre-defined score distribution for a number of financial transactions is presented. The method includes the steps of defining a number of memory spaces for a memory structure, receiving transaction data for the financial transactions, and scoring each of the financial transactions based on the transaction data to generate a batch of scores for financial transactions. The method further includes dividing a score range into k bins, each of the k bins representing one memory space of the memory spaces of the memory structure, and aggregating the batch of scores for the financial transactions by storing a count of each score of the batch of scores in an associated memory space of the plurality of memory spaces.

The method further includes computing a percentile for each score in the batch of scores based on a set of values associated with the count of each score, and storing the percentiles for the batch of scores in the memory structure. In some implementations, the method further includes, for each new financial transaction in a predefined new batch of financial transactions, scoring each new financial transaction based on new transaction data associated with the new financial transaction to generate a new score, assigning a new percentile to the new score according to the set of values, and translating the percentile of the new score to a calibration score with fixed percentile characteristics according to a fixed reference curve.

In another aspect, an alternative computer-implemented method for maintaining a pre-defined score distribution for a plurality of financial transactions is presented. The method includes defining a binary tree for a memory structure. The binary tree has a number of nodes. The method further includes receiving transaction data for financial transactions, scoring each of the financial transactions based on the transaction data to generate a batch of scores for the financial transactions, and assigning each score of the batch of scores to one of the nodes. The method further includes computing a percentile for each score in the batch of scores based on its position in a node of the binary tree memory structure.

In some implementations, for each new financial transaction in a predefined new batch of financial transactions, the method further includes scoring each new financial transaction based on new transaction data associated with each new financial transaction to generate a new score, and assigning the new score to a leaf node of the plurality of nodes. The method further includes computing a percentile for each node by tracking a path from a root node to the leaf node, and translating the percentile of the new score to a calibration score with fixed percentile characteristics according to a fixed reference curve.

The techniques described herein can be used by customers who observe case volumes in their operational environments change due to holiday periods (Christmas holiday/Summer vacation, etc.), holiday days (Mother's day/Valentine's day), local events (local disasters/major sporting events), changing fraud rates, and model degradation. In addition to calibrating the score to a fixed percentile distribution, the systems and methods described herein allow both the raw and calibrated scores to be provided along with an estimate of additional case volume for those clients that want to increase the operational staff levels to respond to these events.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes systems and methods for adaptively maintaining a pre-defined fixed score distribution of fraud scores by using two different algorithms that compute the percentile of the raw score in a time efficient manner. In some implementations, an algorithm includes a staggered approach and results in a delayed estimate of the percentile for the raw score. This algorithm involves continuously updating the histogram of the scores, and at the end of a pre-defined time period (4 hour, 1 day etc.,) percentiles are computed for the entire score range a priori. These pre-computed percentiles based on an earlier batch are then used as the percentiles for the current incoming raw scores. Accordingly, a simple histogram based algorithm is described that estimates the percentile using O(k) operations, and, as described above, can be performed on a batch schedule for computational efficiency and hence use fewer than O(k) operations.

In other implementations, an algorithm is implemented as an online approach, and results in exact values for the percentiles. This algorithm includes a new binary tree based method that requires only a few computations and fixed number of memory slots. Specifically, according to this method, a final score is computed with $O(\log_2(k))$ computations and k memory slots (stored in a global profile), where k is the number of the bins used to specify the score distribution. For fraud score models, where the score ranges from 1 to 1000, k=1000 gives the exact values of the percentile. Accordingly, a complete binary tree data representation is described, which leads to an efficient $O(\log_2(k))$ percentile estimation algorithm.

A fixed calibrated score distribution can be attained if the percentile of the current raw score is known. The methods described herein avoid the need for hard-coded lookup table-based calibrations using historical data, which are based on assumptions of year-to-year similar changes in score distributions, and which can often be invalid in most scoring environments.

Score Distribution Based on Percentiles

Figure 1:
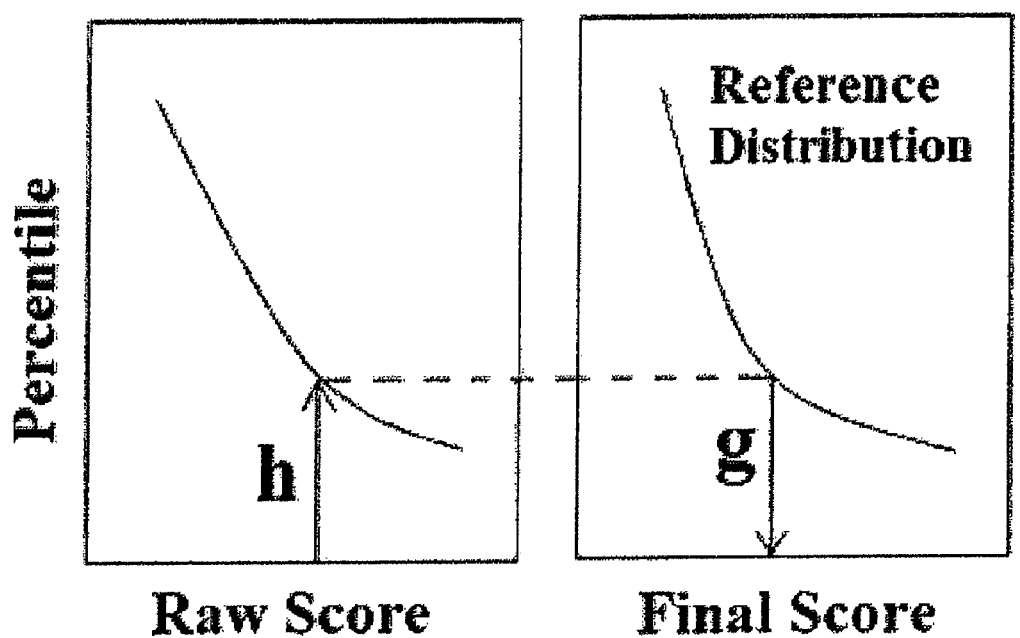
FIG. 1 illustrates the calibration method by using a first function(h) which computes the percentile of the current raw score and a function(g) which assigns final score based on the percentile by using a lookup table

With reference to FIG. 1, given a previous score distribution, a standard fixed score calibration technique can use a calibration table that maps a raw score to a final score, such that the percentage of the transactions that score higher than any particular threshold score in the current model is equal to that of the previous year's model. This map is equivalent to a combination of two functions: a first function(h), which, given raw score($s_i$), gives the percentile of the raw score ($h(s_i)=p$); and a second function(g) which, given percentile (p), gives a corresponding final calibrated score in a reference score distribution. The second function can be implemented as a simple lookup table (percentile vs. final calibrated score) using the reference score distribution.

Histogram Method for Percentile Computation

A simple way to construct such a function (h), which maps a score to its percentile, is to bin the score range and update the histogram of the raw score distribution for each transaction. If the score range is divided into k (k=1000) bins, updating the count for each transaction takes one indexing and one incrementing operation. However, computing the percentile of that bin needs a sum of all the counts from that bin to the end of the distribution for calculating the number of transactions that are above the score threshold. This makes it an O(k) computation. Hence, most of the time will be spent in computing this sum for the denominator, as is the case in many of the problems in computational statistics such as Bayesian methods. However, often applications do not need an immediate or current estimate of percentile values. Therefore, a histogram method can be used to aggregate counts in the k bins and as a batch operation (i.e., hourly, every four hours, daily, etc.), to compute percentiles associated with the scores in all k bins, and to store the values of percentiles in an array.

Between batch updates, the scoring system uses the percentile estimate based on the previous batch update: when a transaction is scored, a count is recorded in an appropriate $k^{th}$ bin, and a single array look up is made to get the $k^{th}$ entry of the score-to-percentile array which was updated at the end of the previous batch. Since the percentile array is not updated in real-time, this results in a delayed estimate of the percentile values, but allows for the O(k) operations to be spread over many transactions where the number of transactions N between batch updates will be much larger then k, N>>k. The interval for the batch update allows an opportunity to control precisely the time window over which the score-to-percentile estimates are updated, and hence allows as an example an hourly adjustment to the score distribution. The tradeoffs of staggered (batch) histogram estimates as compared to the real-time update method are described in further detail below.

Complete Binary Tree Representation for the Percentiles

Figure 2:
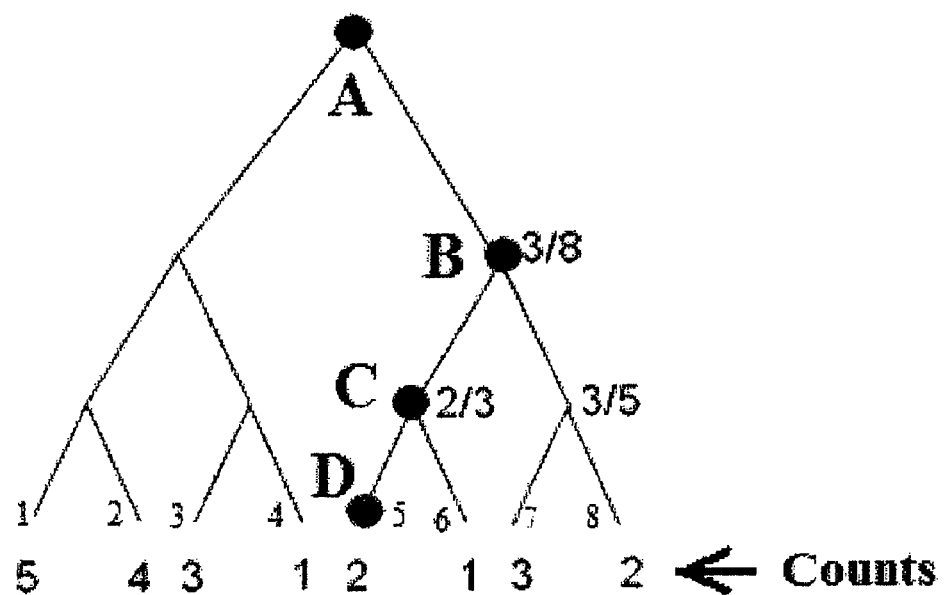
FIG. 2 illustrates a binary tree memory structure used in some implementations of a method for adaptively maintaining a pre-defined fixed score distribution of fraud scores.

Instead of storing the frequency counts and then computing the percentiles in batch, an alternative technique stores the percentiles of score bands as a complete binary tree as shown in FIG. 2. Each internal node of the tree corresponds to a particular score band and leaf node corresponds to a unique score. The complete binary tree is for example only, and the actual preferred implementation of the complete binary tree uses an array such that the nodes can be accessed by simple indexing operations.

The example shown in FIG. 2 represents a binary tree for 8 bins, where each bin corresponds to a single score, and which are shown as the leaves of the tree. Also shown in FIG. 2 are the counts, the number of scored transactions in each score bin. The leaf D represents the bin corresponding to the score of 5 and there are 2 transactions with score 5 out of the total 21 scored transactions. The internal nodes A, B and C do not represent any individual scores but a band of scores. For example node B represents scores 5, 6, 7, and 8. At each internal node, the number represents the fraction of the population that is to its left within the score band associated with the node. The root node represents the fact that 13 out of the total 21 scored transactions are to the left of the root node. For the internal node B, 3 out of the 8 scored transactions that correspond to bin 5 and bin 6 are to the left, while the remaining 5 scored transaction counts are to the right. Given these fractions at all the internal nodes in the tree, the percentile of any leaf can be computed by tracking the path from the root node to that leaf and using only these values. The advantage in this representation is that if new counts are added to a bin, only those fractions which correspond to the nodes in that path from the root to the bin need to be updated. Since the number of nodes in any path from root to the leaf is log(k)−1, the percentiles can be computed, and the tree can be updated for each incoming score in O(log(k)) time. The percentiles at each node can be computed by using the total counts and the left fractions of the parent node and the current node as shown by the following equations for the example shown in FIG. 2:

$$P(A)=13/21;$$

$$P(B)=P(A)+(N(B)/N(A))*f(B); N(B)=N(A)*(1-f(A));$$
$$P(B)=13/21+8/21*(3/8)=16/21$$

$$P(C)=P(B)-(N(C)/N(A))*(1-f(C)); N(C)=N(B)*f(B)$$
$$P(C)=16/21-(8/21)*(3/8)*(1/3)=15/21$$

$$P(D)=P(C) \; P(D)=15/21$$

The leaf D represents the bin corresponding to the score of 5, whereas the internal nodes A, B and C do not represent any individual scores but a band of scores. For example, node B represents scores from 5 to 8. Also shown in the figure are the counts, number of scored transactions in each score bin. P represents the percentiles (fraction of the population which is left to the node, i.e., the fraction of the total transactions that are scored less than the current score), N the frequency count and f, the left fraction of the score bands represented by those internal nodes. At the leaf, the percentiles include the counts that correspond to the node in addition to the population that is to its left (≦ instead of <). The P here represents the lower percentile, i.e., the fraction of the total transactions that are scored less than the current score. 1−P gives the upper percentile value that is more commonly used in the score distribution plots in fraud transaction scoring model report where high scores correspond to a higher probability of fraud. N(A) is a normalization factor, and without loss of generality, it can be assumed N(A)=1. Accordingly, the recurrence relations to compute the percentiles at each internal node for any complete binary tree are given by:

$$N(\text{root})=1; P(\text{root})=f(\text{root});$$

$$N(\text{child})=N(\text{parent})*(1-f(\text{child}));$$

$$P(\text{child})=P(\text{parent})+N(\text{child})*f(\text{child}); \text{ if it is a right child.}$$

$$N(\text{child})=N(\text{parent})*f(\text{child});$$

$$P(\text{child})=P(\text{parent})-N(\text{child})*(1-f(\text{child})); \text{ if it is a left child.}$$

$$f(\text{leaf})=1 \; \{\text{if percentiles are counted including the bin (i.e., } \leqq \text{ instead of }<)\}$$

Hence, at most 4*log(k) computations are needed for each percentile computation. The counts(N) and percentile(P) do not need to be stored for all the internal nodes. They are computed on the fly for the nodes that are in the path to the leaf node by using the above recurrence relations. Updating the counts (fractions on the nodes, f) for each initial score is done by the following equations:

$$f(\text{node})=(1-1/N_{Total})*f(\text{node})+1/N_{Total} \text{ if left child is in path.}$$

$$f(\text{node})=(1-1/N_{Total})*f(\text{node})-1/N_{Total} \text{ if right child.}$$

where $N_{Total}$ is the total number of scores so far. Note that this algorithm is a dynamic programming approach, since it entails dividing the problem into sub-problems, storing sub-problem solutions, and using recurrence relations.

Figure 3:
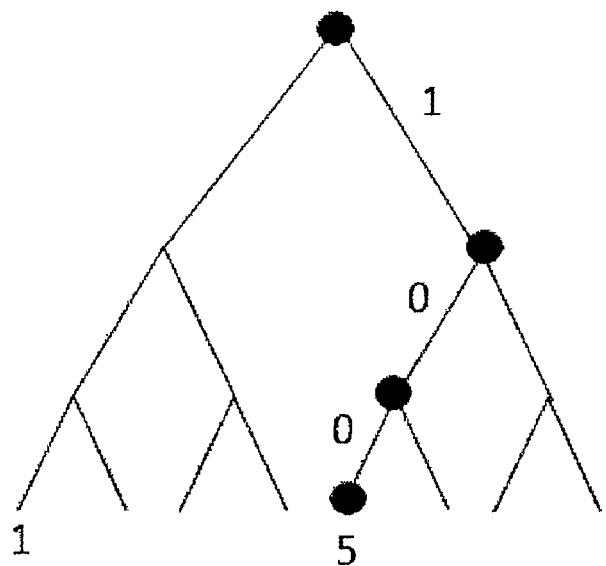
FIG. 3 illustrates a path for a score in a binary tree memory structure.

As shown above, to compute the percentile, the path from the root to the leaf is needed. Since this is a complete binary tree that can be stored as an array, this leads to a very simple method to get the path by converting the score from decimal to binary as shown in FIG. 3, which illustrates the path for score=5. '1' specifies that the next node is a right child, while '0' specifies that the next node is a left child. If the scores are stored as integers, the path can be obtained very efficiently by just using the bit-shift operations, instead of converting the score from decimal to binary An Adaptive Algorithm The algorithm stated above is exact and deterministic, in that it will give the same value as if all the scores were stored and then sorted. However, in many cases the percentile estimate is desired to be biased towards the most recent scores compared to the old scores and then the percentiles can be continuously adapted with new scores. A preferred method includes an adaptive algorithm that caps the $N_{Total}$ used in the update steps. Accordingly:

$$f(\text{node})=(1-1/N_{cap})*f(\text{node})+1/N_{cap} \text{ if left child is in path.}$$

$$f(\text{node})=(1-1/N_{cap})*f(\text{node})-1/N_{cap} \text{ if right child}$$

If $N_{cap}$=10000 is used, a simple decay step can be used for the fractions. Low values of $N_{cap}$ give more importance to the recent values to adapt the percentiles rapidly to the incoming distributions, as illustrated below:

$$f(\text{node})=0.9999*f(\text{node})+0.0001 \text{ if left child is in path.}$$

$$f(\text{node})=0.9999*f(\text{node})-0.0001 \text{ if right child}$$

Increasing Efficiency

While this algorithm is exact and works with any score distribution, the number of computations can be further reduced for special score distributions. For example, a fraud score distribution such as provided by Falcon™ is non-uniform and most of the scores lie within the low-score (i.e. likely non-fraud) band of 1-100. The number of scores below 10 is much higher compared to those between 10 and 100, which again are much more densely populated than the number of scores above 100. This fact can be used to significantly reduce the computations by dividing the score range into three bands: scores 1 to 8($2^3$), scores 9 to 40 (Number of Scores=32=$2^5$) and scores 41 to 1000. Percentiles of the first score band (1 to 8) can be implemented by a smaller tree with a height 3, the second score band can be implemented by a tree of height 5, while the remaining scores can use a tree with height 10. Thus, updating the percentiles of the first, second and third bands takes just O(3), O(5) and O(10) computations respectively, thereby dramatically reducing the total number of computations. The fractions of the population that falls in these three bands still need to be updated with each transaction in addition to updating the binary trees, which takes no more than 3 update operations.

Figure 4:
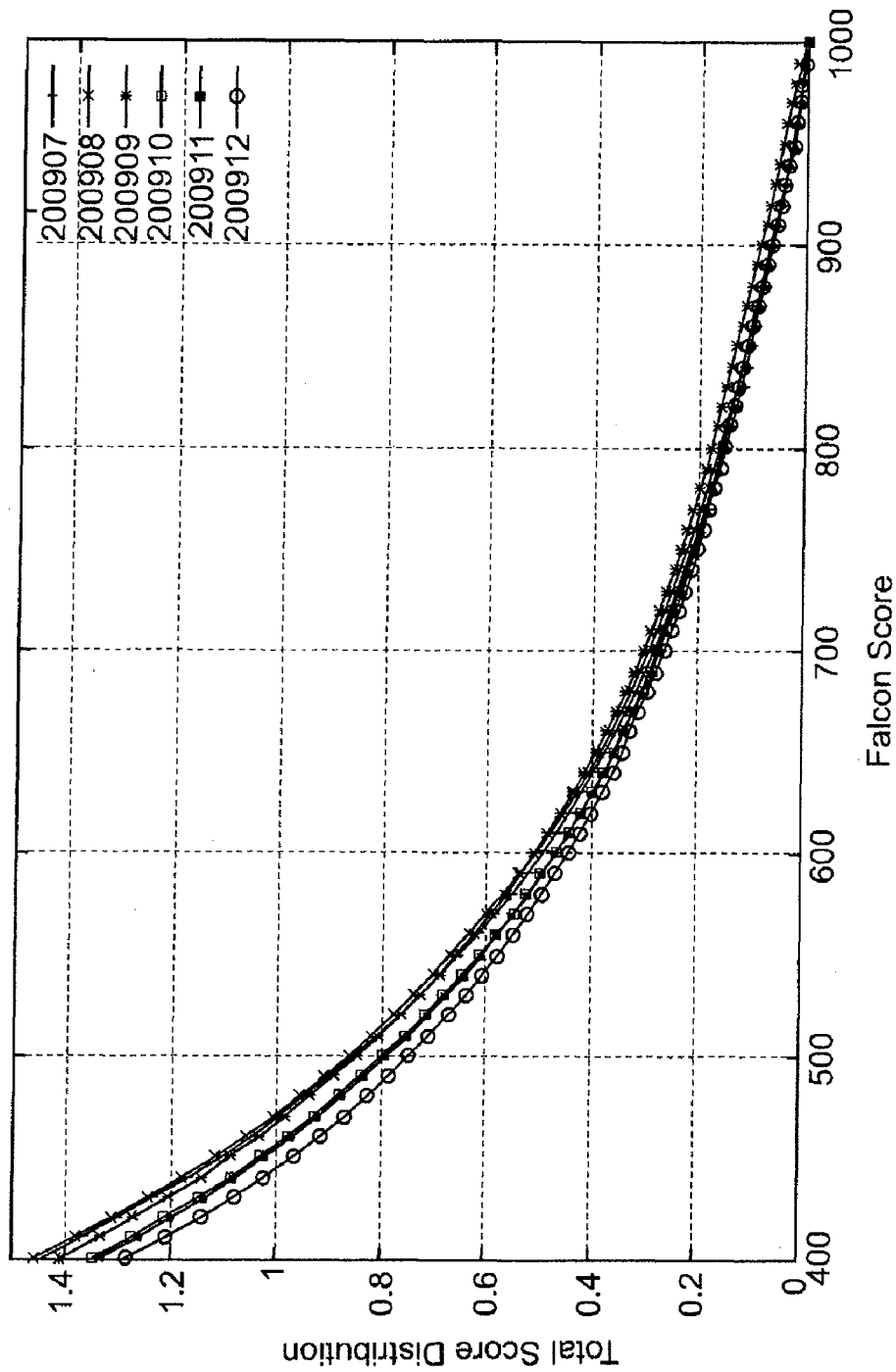
FIGS. 4-8 show computational results of test data produced according to methods and systems described herein.
Figure 5:
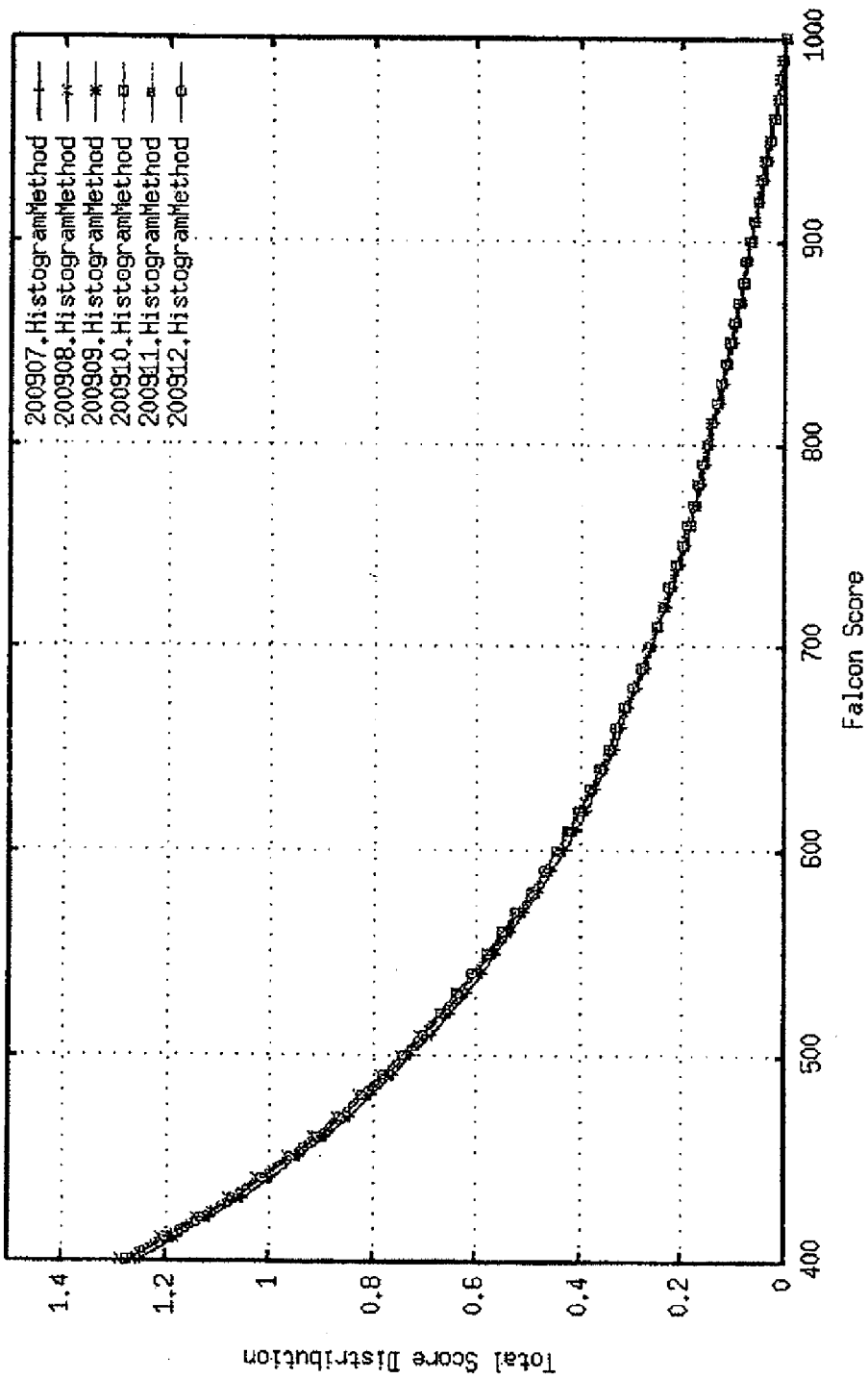
Figure 6:
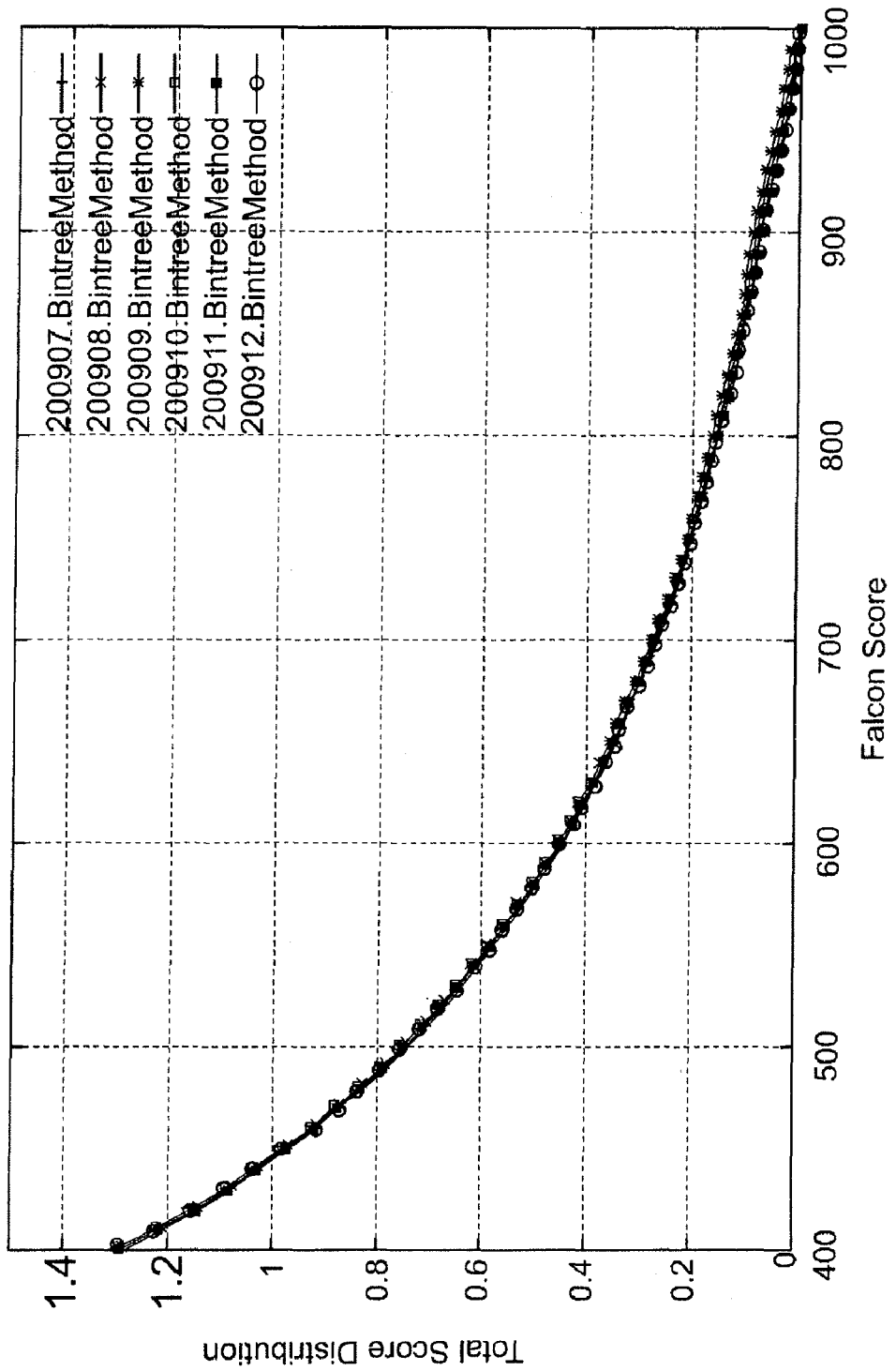

FIG. 4 presents an actual monthly fraud score distributions for a test data set. The score distribution can be seen to vary from month to month. FIG. 5 shows the results of using the staggered (batch) histogram method, where counts are accumulated over a 24 hour period, and the score-to-percentile table is updated daily. FIG. 6 shows the results using the binary tree online method. The brown curve from the plot in FIG. 4 which corresponds to the fraud score distribution from December 2009 is used as a reference distribution. Either methodology performs very well, with minor variation in score distributions from month to month.

The results in the binary tree method shown in FIG. 6 use 10,000 as the capping factor, which allows a natural timescale to be represented in the percentile calculation. Other capping factors can be used. As can be seen in the plots, the score distribution is very stable using both methods. The relative error in tracking the reference distribution with both methods is illustrated in a plot shown in FIG. 7. The red curve represents the base reference score distribution and difference between the score distribution and the reference distribution is plotted on the x-axis.

Figure 7:
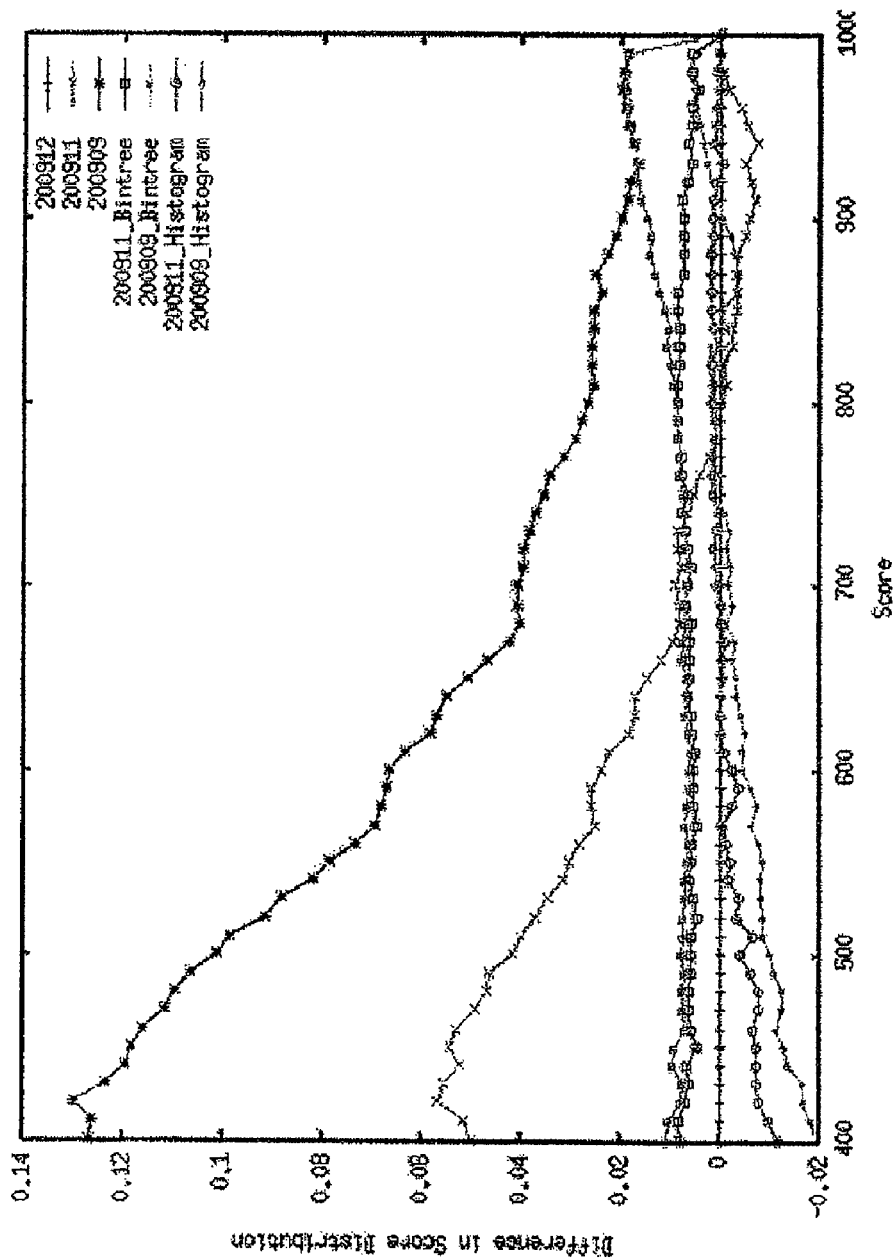

FIG. 7 illustrates that both the online binary tree method and the staggered (batch) histogram method reduced the differences between the monthly score distributions. However, in the online binary tree method for the month of 2009/09, the distribution in the higher score band is not well tracked. This can be attributed to using the same capping factor of 10,000 for the entire score band. Since the number of scores are much less dense in the higher score band, this is not tracked well and points to some sensitivity of the online binary tree method to the capping factors. These results show that both methods are capable of calibrating to a reference curve.

Change in Performance

The technology of using a calibrated score to maintain a fixed score distribution has a number of advantages, one being that a score threshold can accurately be set to allow a predictable number of cases to be generated day-to-day. This is different than if one were to work with the raw score, as there may be deviations for a particular client from the model report that is typically established based on consortium statistics. Deviations will also occur due to spending pattern changes, holiday fluctuations, fraud rate changes, and model degradation.

Figure 8:
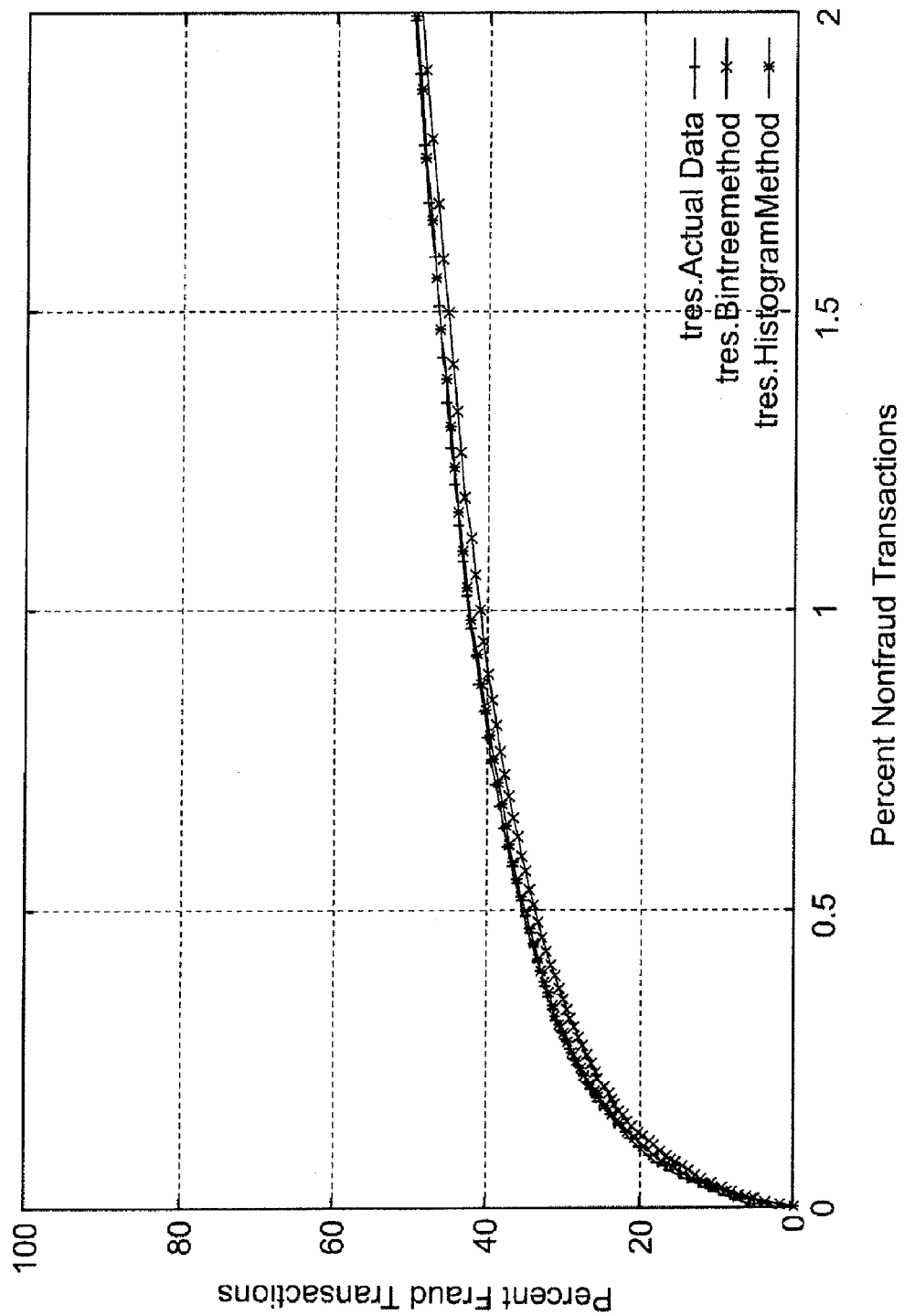

The plot in FIG. 8 shows that the performance is unchanged when using the staggered (batch) histogram method of calibrating the raw score. This is understandable as the performance plot above is normalized by the percentage of non-fraud transactions which essentially is equal in fraud applications to the outsort rate rank-ordered by the fraud score. The calibrated score allows for an optimal use of a fixed number of analysts. As an example, in a normal situation a score threshold of 900 produces 2000 cases a day, and in a particular week the fraud pattern drops or a transaction spending pattern changes so that the model is producing 1500 cases at the 900 score threshold, then analysts working at a score threshold of 900 would not have enough cases to work. Conversely, if the number of cases at a score threshold of 900 goes to 3000, then analysts are working at a false positive ratio that is larger than optimal. The calibrated score focuses on a continuous ranking of highest value cases to work, to better balance work load with the most optimal cases to review.

Without calibrating the raw score, analysts will either be working too few cases, i.e. a sub-optimal use of operational resources, or have too many cases and therefore working at too high of a false positive ratio, which is also inefficient. By using the calibrated score, the value detection rises due to this behavior of varying case volume in the raw score. There are situations where clients will want to work with the raw score. This is typically a situation where the client believes that certain time-periods warrant temporarily increasing its staff to handle an increase in the case volume, such as during holiday periods or during a particularly high-fraud period of time. In this situation, it is important for the operations to understand by how much the case volume is expected to increase to help understand demands.

As an example, in the model report the reference score distribution indicates that a raw score threshold of 900 corresponds to non-fraud score percentage of 0.24%. In production, the system will compute the true percentile for the raw score and compute the calibrated score. At the same time, the system could indicate the change in case volume if one were to work with the raw score. For example, if the raw score is 900 and the algorithm computes the percentile for this score to be 0.36%, it will generate a calibrated score of say 840 that matches with the 0.36% percentile. However, the algorithm can be used to report that there is a (0.36−0.24)/(0.24)=+50% increase in the number of cases in production at a raw score of 900 compared to the cases predicted by the model report at a score of 900.

In this situation, a raw 900 score for the transaction is calibrated to a score of 840, and if one works with the calibrated score at a 900 threshold, then the transaction would not be reviewed; analysts would work only with the calibrated scores that are greater than 900 to work on riskier cases. If a bank wanted to work more cases, they could elect to continue to work the 900 raw score and increase the number of analysts working cases.

Note that in comparing the raw score to the model report, there are situations in which the raw score distribution does not meet the consortium model score distribution statistics for some clients given that the consortium result is based on a aggregation of client portfolio data. For some outlier client portfolios, there will always be a continuous offset in the calibration score due to differences among client portfolios. For these clients, it is important to understand how to interpret the change relative to their raw score distribution in production (the offset from the model report). This would be done by using a moving average of computed percentile for a raw score, say over the last 6 weeks of transactions with that raw score. If on average a raw score of 900 corresponds to 0.30% for a particular client whose score distribution is systematically offset from the model report statistics, then the local fluctuation of 0.36% results in a 20% increase in cases. Of course, it will be appreciated that the description related to specific scores is exemplary only, and that any numerical value can be used for the score.

CPU Cost

Regarding the computational costs associated with the two methods, the histogram method has much less computational overhead compared to the online method. In tests associated with a typical Falcon Fraud model, for instance, the histogram method added approximately 0-0.2% of CPU cost compared to the online method that added upwards of 1-4% additional CPU cost. These ranges can be modified depending on the batch frequency or implementation of the online method. The histogram method appears to have the highest performance and least CPU impact to model execution, which makes the method superior for fraud applications. In other situations where online (real-time) percentile estimation is essential, the online binary tree method is still usable.

Both the histogram and online binary tree method perform well in calibrating the score distribution to a reference distribution. However, the online binary tree based method has a higher CPU cost compared to the staggered (batch) histogram method. In high-throughput environments with tight response times, the histogram method is likely preferred. The ability to calibrate raw scores to a fixed reference curve provides the most optimal use of fixed operational resources. For customers who may want to elect to increase their staff during particular events, say during a busy consumer spending period such as a holiday, the approach can estimate of the percentage increase in the scores above the reference curve or their average production raw score distribution.

Figure 9:
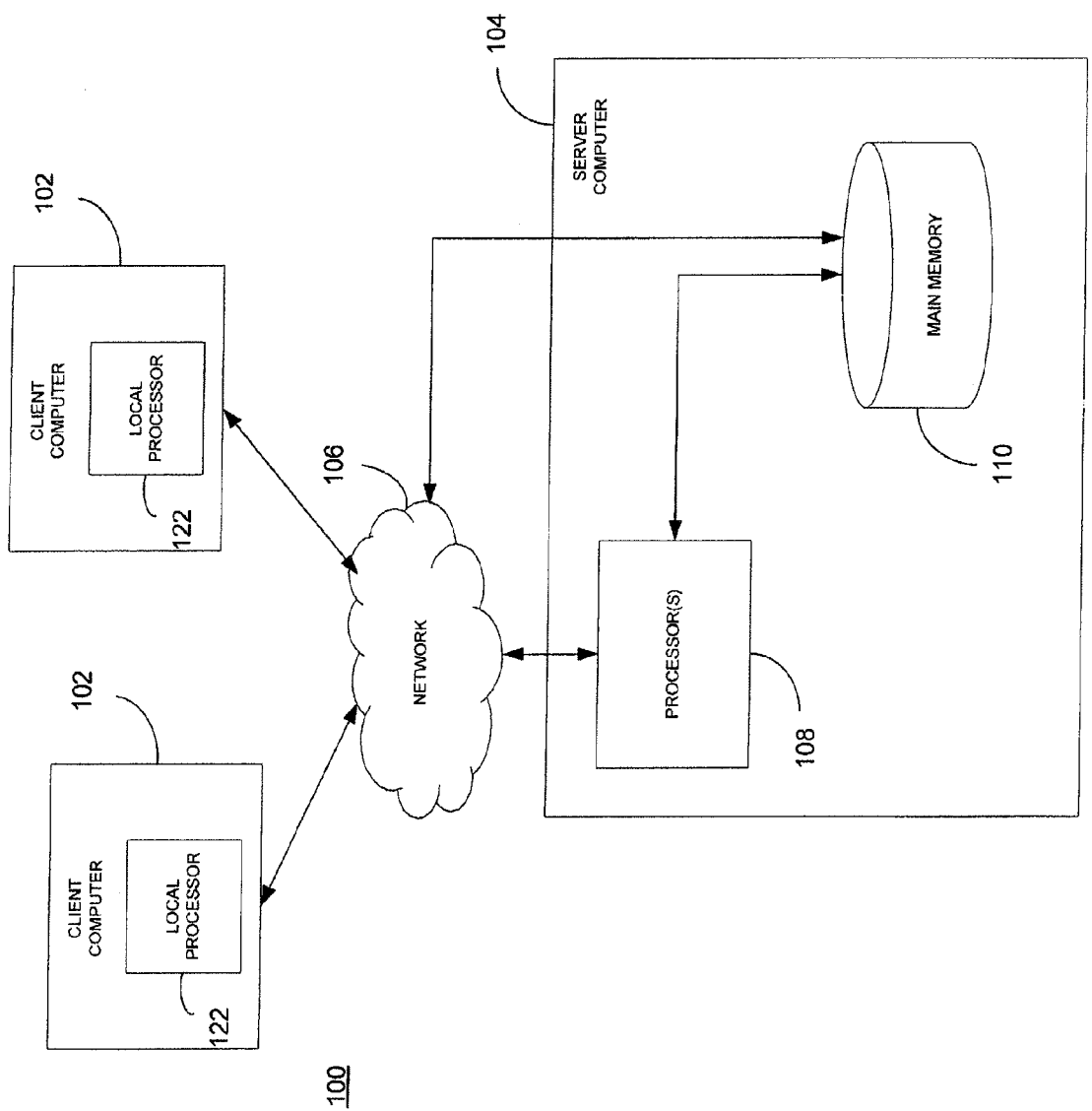
FIG. 9 is a functional block diagram of a system for time-efficient and deterministic adaptive score calibration, for maintaining a predefined score distribution.

FIG. 9 illustrates a computer system 100 for executing a method for time-efficient and deterministic adaptive score calibration techniques, for maintaining a predefined score distribution, as described above. The computer system 100 can include a number of client computers 102 each having a local processor 122 executing a program for maintaining a predefined score distribution, using adaptive score calibration methods and techniques. The client computers 102 can be associated with a bank, a credit agency, or other financial institution. The client computers 102 may also act as a server computer within a local network for the financial institution.

The client computers 102 are connected to a server computer 104 via network 106, which can include any number of communications networks. The server computer 104 includes one or more processors 108 for executing instructions of the method for developing financial risk decisions for the customer. The method can be stored as instructions in main memory 110, which can be any form of persistent storage as described below. Access to the instructions from main memory 110 can also be directly from local processors 122 of any of the client computers 102 through the network 106.

Figure 10:
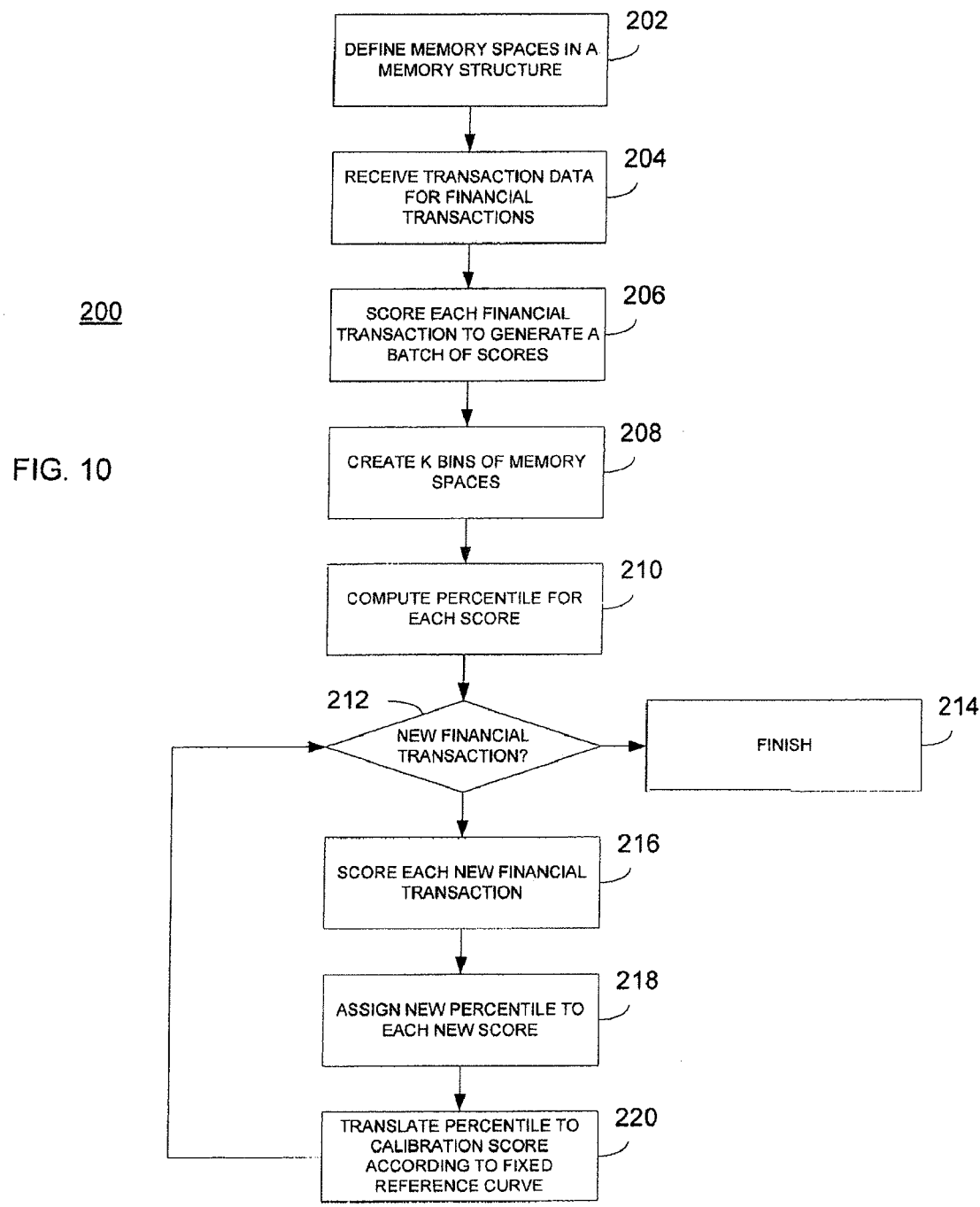
FIG. 10 is a flowchart of a method for time-efficient and deterministic adaptive score calibration.

FIG. 10 is a flowchart of a method 200 for maintaining a predefined score distribution, using adaptive score calibration methods and techniques. At 202, a number of memory spaces are defined for a memory structure. At 204, transaction data for a number of financial transactions are received, such as by a server computer, for example. The transaction data can include credit card transactional data such as purchase amount, credit card number, and/or other data associated with a purchase transaction using a credit or debit account. At 206, each financial transaction is scored based on the transaction data, to generate a batch of scores for the financial transactions.

At 208, a number k of bins of memory space are created in the memory structure, by dividing a score range of all the k scores from 206 into k bins. Each of the k bins represents one memory space in the memory structure. The batch of scores for the financial transactions are then aggregated by storing a count of each score of the batch of scores in an associated memory space of the memory spaces. At 210, a percentile is computed for each score in the batch of scores based on a set of values associated with the count of each score, and the percentiles are stored in the memory structure.

At 212, a determination is made regarding new financial transactions. If no new financial transactions are to be monitored or scored, the method 200 finishes at 214. Otherwise, for each new financial transaction, at 216 a score is made based on new transaction data associated with the new financial transaction to generate a new score. At 218, a new percentile is assigned to the new score according to the set of values determined at 210. A fixed reference curve can be established, based at least in part on the set of values. Then, at 220, the percentile is translated to a calibration score with fixed percentile characteristics according to the fixed reference curve.

Figure 11:
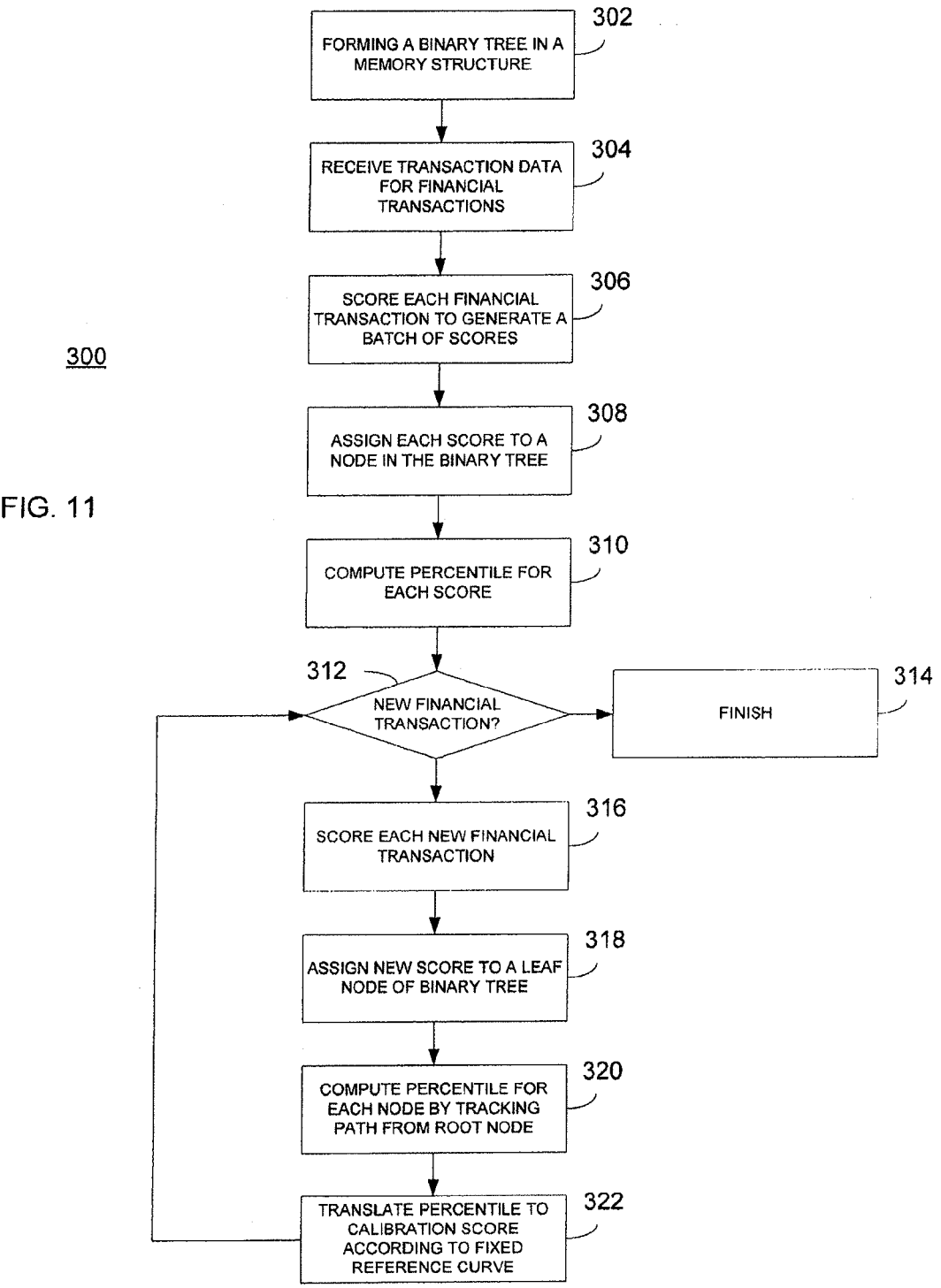
FIG. 11 is a flowchart of an alternative method for time-efficient and deterministic adaptive score calibration.

FIG. 11 is a flowchart of an alternative method 300 for maintaining a predefined score distribution. At 302, a binary tree is formed in a memory structure. The binary tree includes a number of nodes. At 304, transaction data for a number of financial transactions are received, substantially as described above with respect to the method 200 illustrated in FIG. 10. At 306, each financial transaction is scored based on the transaction data, to generate a batch of scores for the financial transactions.

At 308, each score is assigned to one of the nodes of the binary tree memory structure. At 310, a percentile is computed for each score in the batch of scores based on its position in a node of the binary tree memory structure. At 312, a determination is made regarding new financial transactions. If no new financial transactions are to be monitored or scored, the method 300 finishes at 314. Otherwise, for each new financial transaction, at 316 a score is made based on new transaction data associated with the new financial transaction to generate a new score. At 318, the new score is assigned to a leaf node of the binary tree memory structure, and at 320 a percentile is computed for each node by tracking a path from a root node of the binary tree to the leaf node associated with the score. At 322, the percentile is translated to a calibration score with fixed percentile characteristics according to a fixed reference curve established for the binary tree memory structure.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method for maintaining a predefined score distribution for a plurality of financial transactions, the method comprising:
    defining a plurality of memory spaces for a memory structure;
    receiving transaction data for the plurality of financial transactions
    scoring each of the plurality of financial transactions based on the transaction data to generate a batch of scores for the plurality of financial transactions;
    dividing a score range into k bins, each of the k bins representing one memory space of the plurality of memory spaces of the memory structure;
    aggregating the batch of scores for the plurality of financial transactions by storing a count of each score of the batch of scores in an associated memory space of the plurality of memory spaces;
    computing a percentile for each score in the batch of scores based on a set of values associated with the count of each score;
    storing the percentiles for the batch of scores in the memory structure; and
    for each new financial transaction in a predefined new batch of financial transactions:
        scoring each new financial transaction based on new transaction data associated with the new financial transaction to generate a new score;
        assigning a new percentile to the new score according to the set of values; and
        translating, by the computer, the percentile of the new score to a calibration score with fixed percentile characteristics according to a fixed reference curve.

2. The method in accordance with claim 1, further comprising generating the fixed reference curve based on the value of the percentile.

3. The method in accordance with claim 1, further comprising:
    defining a new batch of scores for a set of the new financial transactions;
    aggregating the new scores into an associated memory space of the plurality of memory spaces; and
    computing a new percentile for the new batch of scores.

4. The method in accordance with claim 3, further comprising:
    defining a score-to-percentile array for the memory structure based on the batch of scores and the percentile; and
    updating the score-to-percentile array for the memory structure based on the new batch of scores and the new percentile.

5. The method in accordance with claim 1, wherein the predefined new batch of financial transactions is based on N new financial transactions selected by a user.

6. The method in accordance with claim 5, wherein the N new financial transactions is selected by the user to control a window for updating a score-to-percentile array for the memory structure based on the new batch of scores and the new percentile.

7. A computer-implemented method for maintaining a predefined score distribution for a plurality of financial transactions, the method comprising:
- defining a binary tree for a memory structure, the binary tree having a plurality of nodes;
- receiving transaction data for a plurality of financial transactions;
- scoring each of the plurality of financial transactions based on the transaction data to generate a batch of scores for the plurality of financial transactions;
- assigning each score of the batch of scores to one of the plurality of nodes;
- computing a percentile for each score in the batch of scores based on its position in a node of the binary tree memory structure; and
- for each new financial transaction in a predefined new batch of financial transactions:
  - scoring each new financial transaction based on new transaction data associated with each new financial transaction to generate a new score;
  - assigning the new score to a leaf node of the plurality of nodes;
  - computing a percentile for each node by tracking a path from a root node to the leaf node; and
  - translating, by the computer, the percentile of the new score to a calibration score with fixed percentile characteristics according to a fixed reference curve.

8. The method in accordance with claim 7, further comprising generating the fixed reference curve based on the value of the percentile.

9. The method in accordance with claim 7, further comprising defining a cap number N for the new financial transactions, the cap number N providing a weighting function to the new financial transactions.

10. The method in accordance with claim 9, further comprising adjusting, by the computer, the cap number N to provide a relative weight to a more recent set of the new financial transactions.

* * * * *